United States Patent Office 3,426,795
Patented Feb. 11, 1969

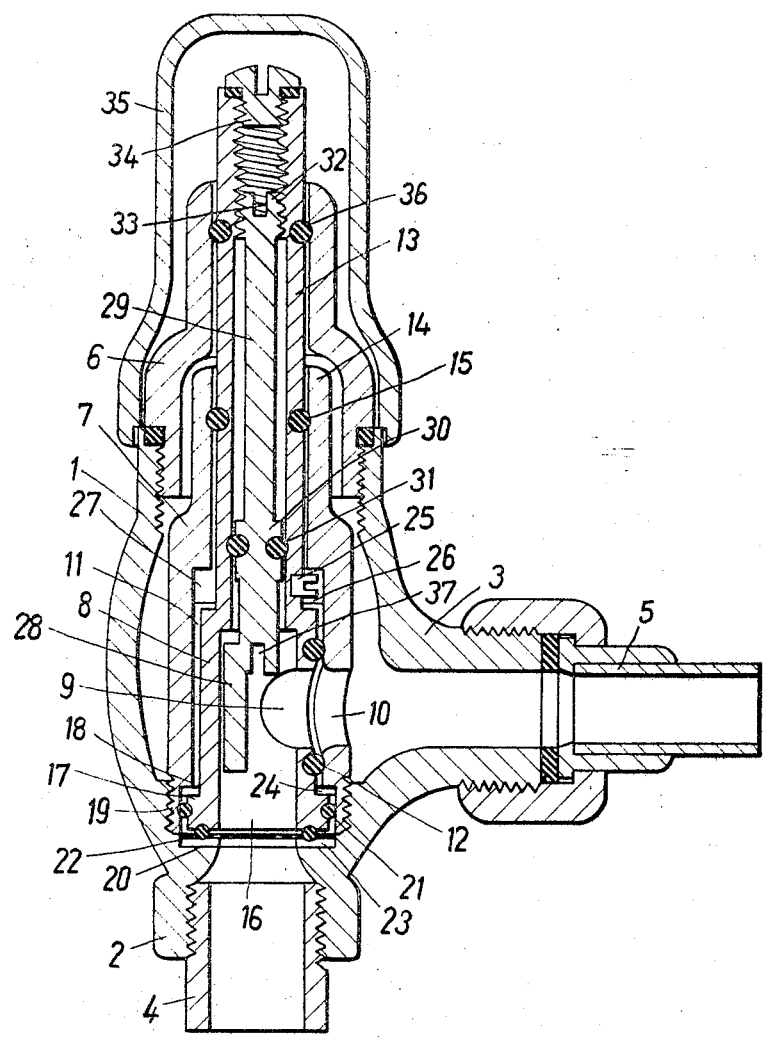

3,426,795
ADJUSTABLE STOPCOCK
Adolf Muller, Gerberngasse 26, Bern, Switzerland
Filed Sept. 16, 1965, Ser. No. 487,723
Claims priority, application Switzerland, Sept. 17, 1964,
12,094/64
U.S. Cl. 137—614.17          7 Claims
Int. Cl. F16k *5/10, 5/04*

ABSTRACT OF THE DISCLOSURE

A stopcock having a hollow cylindrical member fitting into a bore formed in an outer member with flow openings being formed through said members which are aligned when the stopcock is open. The outer surface of the cylindrical member and the bore define an annular space and a sealing member is disposed in said space.

---

The invention relates to stopcocks, plug taps or faucets. Taps or faucets of this kind are simple, compact, rapid-acting and can easily be constructed as distributors or multi-way taps or faucets. These advantages are, however, associated with drawbacks; the usual method of fitting by grinding in place is expensive, and the resistance to motion (working resistance) is considerable, owing to the comparatively large surfaces in sliding contact, particularly if these surfaces are corroded or damaged or contaminated by foreign bodies introduced with the fluid medium to be controlled, which is further a cause of leakage.

An object of the invention is to provide a stopcock, plug tap or faucet which is free from the aforesaid disadvantages and can furthermore easily be equipped with means for adjusting the flow cross-section, whereby noises in the piping can be avoided, and a drip-preventing attachment at the mouth of an outlet tap or faucet for liquids is no longer necessary to prevent spattering of issuing liquid.

To achieve this object, a stopcock, plug tap or faucet according to the present invention comprises a component having an internal surface defining a bore, a plug fitting into said bore and having an external surface spaced from said internal surface thereby to form an annular space between said component and said plug, said component and said plug having therein through-flow openings which are aligned when the stopcock is open, a selected one of the parts consisting of said component and said plug having an annular groove surrounding the opening therein, and a sealing ring seated in said groove.

An embodiment of the invention will now be described, by way of example, with reference to the accompanying drawing in which the single figure shows an axial section through a stopcock plug tap or faucet according to the invention.

Referring now to the drawing, the tap or faucet has a barrel 1 with two connecting pieces or sockets 2 and 3 for connection with pipes 4 and 5 joined to the tap or faucet. The casing or barrel 1 is closed by a pierced spigot 6. Within the barrel is a component 7 which receives the plug 8. The plug 8 is in the form of a hollow cylinder which is open at one end. This open end communicates with the pipe socket 2. The body of the hollow cylinder forming the plug, has a radial through-flow opening 9. The component 7 surrounding the plug 8 likewise has a radial throughflow opening 10 which is coaxial with the pipe socket 3. An annual gap 11 is formed between the component 7 and the plug 8. An O-section sealing ring 12 is disposed in the gap 11 and is seated in an annular groove in the external surface of the plug 8 and forms a packing between the plug 8 and the component 7. In the open position of the tap or faucet as shown, the through-flow opening 9 in the plug is aligned with the through-flow opening 10 in the component 7. The spindle 13 of the plug 8 passes through a tubular projection 14 of the component 7 and through the bore of the spigot 6. Sealing rings 15 and 36 are inserted between the spindle 13 and the projection 14 and spigot 6 respectively. Each of these sealing rings 15 and 36 is seated in a groove in the spindle 13. At its open end 16, the plug 8 has an external projection 17 which is engaged in a stepped part 18 in the component 7. In the region of the stepped part 18, the component 7 has an external screw thread by means of which it is screwed into an internal thread 19 on the barrel or body 1. At the end of the thread 19 closer to the connecting piece or socket 2, there is an internal step 20 against which bears the open end 16 of the plug 8. Sealing rings 21, 22 of O-section and flat sealing rings or washers 23 and 24, which may be of chromium steel or plastics material with a low coefficient of friction, are fitted between the external projection or flanges 17 on the plug 8, the stepped part 18 and the internal step 20. A radially-projecting grub screw 25 is screwed into the spindle 13 directly next to the plug 8. This grub screw 25 co-operates with two stops 26 and 27 formed internally of the component 7. In the open position of the tap or faucet as shown, the grub screw 25 rests against the stop 26, and in the closed position of the tap or faucet, it rests against the stop 27.

Within the cavity of the plug 8 there is arranged a component 28 which has a curved surface which bears on the cylindrical inner surface of the plug 8. The component 28 is rotatable by means of shaft 29 passing through a longitudinal bore in the spindle 13, so that the through-flow opening 9 in the plug 8 can be closed to a greater or lesser degree. That surface of the component 28 which is turned towards the geometric axis of the plug is concave to prevent swirling or turbulence. The shaft 29 has an intermediate annular flange 30 which is sealed in the bore of the spindle 13 by means of the O-section sealing ring 31, and an end annular flange 32 with an external thread which engages with an internal thread of the spindle 13. The pitch of the thread on the flange 32 and the dimension of the component 28 in the direction of the geometric axis of the plug 8 are so selected that the through-flow opening 9 can be nearly completely closed by turning the component in spite of the axial displacement what is also thereby being effected. The external thread on the flange 32 and the meshing inner thread on the spindle 13 are self-locking, whereby the component 28 is secured against displacement, and rotatable with respect to the plug 8. Also, component 28 is easily fitted in place by introducing its shaft 29 from below, as shown on the drawing, into the spindle 13, and then screwing the flange 32 into the internal thread of the spindle 13, for which purpose a screwdriver can be engaged in the screw slot 37. A further screw slot 33 in the end of the shaft 29 makes it possible to rotate this shaft by a screwdriver, after remvoal of the cap 35 and a closing screw 34 on the spindle 13 and thus to close off the through-opening 9 in the plug 8 by a desired amount. It is thus unnecessary to shut off the pipe leading to the tap or faucet. The spindle 13 is designed at its upper end in a manner not shown in the drawing, to have a key or spanner applied thereto for the purpose of opening and closing the tap or faucet. The spindle could, of course, alternatively be made to project through the cap 35 and be provided with a handle.

The O-section sealing rings 12, 15, 21, 22, 31 and 36 may, for example, be made of Teflon (polytetrafluoroethylene).

The groove or slot receiving the O-section sealing ring 12 may be in the internal surface of the component 7, instead of in the external surface of the plug 8, it then being unnecessary to seal the lower end of the plug 8 relative to the component 7. This construction is, however, more complicated than that shown both in manufacture and possible changing of the sealing ring 12.

The O-section sealing rings may be replaced by sealing rings of other cross-section, for instance elliptical or rectangular cross-section.

The tap or faucet described is suitable for liquids and gases.

I claim:

1. A stopcock comprising an outer member having an internal surface defining a bore; a hollow cylindrical member fitting into said outer member, said cylindrical member having an opening at one end and having an external surface spaced from said internal surface to form an annular space between said members, said members having flow openings extending therethrough which are aligned when the stopcock is open; first sealing means disposed in said annular space to form a packing between said members; said cylindrical member having an external projection formed on said one end thereof and adapted to engage a stepped portion formed on said outer member; a barrel threadably engaging the external surface of said outer member near said stepped portion thereof, said barrel having an inwardly-projecting step formed thereon; said external projection having an outer end bearing on said inwardly-projecting step; and second sealing means sealing said external projection against said stepped portion of said outer member and said inwardly-projecting step.

2. A stopcock as set forth in claim 1, wherein said first sealing means extends in a groove formed in said cylindrical member.

3. A stopcock as set forth in claim 1, wherein said first sealing means extends in a groove formed in said outer member.

4. A stopcock as set forth in claim 1, further comprising a component displaceable in said cylindrical member, and means for adjusting said component to regulate the size of the flow opening through said cylindrical member.

5. A stopcock as set forth in claim 4, further comprising a spindle on said cylindrical member and having a longitudinal bore, said adjusting means comprising a shaft integral with said component and passing through said longitudinal bore.

6. A stopcock as set forth in claim 5, further comprising an internal screw thread on said longitudinal bore and an external screw thread on said shaft, said external thread being self-locking on said internal thread.

7. A stopcock as set forth in claim 4, in which said component has a curved surface bearing against the cylindrical inner surface of the cylindrical member.

References Cited

UNITED STATES PATENTS

| | | | |
|---|---|---|---|
| 1,065,913 | 7/1913 | Bice | 137—614.17 |
| 1,070,896 | 8/1913 | Hughes | 251—121 |
| 2,702,050 | 2/1955 | Thomas | 251—310 |
| 3,033,226 | 5/1962 | Allen | 251—317 |
| 3,166,097 | 1/1965 | Hinderer et al. | 251—310 |
| 3,257,096 | 6/1966 | Floren et al. | 251—317 |

FOREIGN PATENTS 1,470  1878  Great Britain.

M. CARY NELSON, *Primary Examiner.*

JOHN R. DWELLE, *Assistant Examiner.*

U.S. Cl. X.R.

251—310